United States Patent Office 3,483,029

Patented Dec. 9, 1969

3,483,029

METHOD AND COMPOSITION FOR DEPOSITING NICKEL-IRON-BORON MAGNETIC FILMS

Herman Koretzky and Arnold F. Schmeckenbecher, Poughkeepsie, N.Y., assignors to International Business Machines Corporation, Armonk, N.Y., a corporation of New York

No Drawing. Filed July 15, 1966, Ser. No. 565,401
Int. Cl. G03g *19/00;* C04b *35/00*
U.S. Cl. 117—236 9 Claims

ABSTRACT OF THE DISCLOSURE

Depositing thin Ni-Fe-B magnetic films on a surface by activating the surface to receive an electroless deposit, contacting the surface with an aqueous electroless bath comprising water soluble nickel and iron salts, a complexing agent, an alkalizing agent to maintain the pH of the bath above about 8, and a boron-nitrogen reducing agent, and electrolessly depositing an Ni-Fe-B film from the bath while applying a magnetic orienting film of at least 5 oersteds in the plane of the film during deposition.

Also claimed is a bath for depositing a thin Ni-Fe-B magnetic film, the bath being substantially as described above.

The present invention relates to the deposition of ferromagnetic nickel-iron-boron films which are particularly well suited for flat film memories and other bulk type memories. More specifically, the invention is concerned with an electroless process and composition for depositing such films.

According to present practice, thin magnetic films are deposited by vacuum or sputtering techniques. To obtain the desired magnetic properties, the vacuum deposited ternary films must be extremely thin, that is, about 1,000 A. They must be deposited on well controlled substrates, such as evaporated silicon monoxide layers and the angle of incidence of the metal atoms onto the substrate must be uniform. It has been found to be very difficult to deposit a layer with uniform magnetic properties on an extended flat area or on a non-flat surface, for instance, when it is necessary to deposit a magnetic flux closure film around a conducting strip line. Also, vacuum deposition techniques require a considerable outlay in terms of capital cost and are subject to numerous time consuming pumpdowns.

Accordingly, the objective of the present invention is to provide a method and composition for depositing nickel-iron-boron films of uniform thickness on extended and non-flat surfaces. A further objective is to deposit films of the type described which are anisotropic ($H_K$ about 6 oersteds) and have a coercive force as low as 1 oersted.

In accordance with the present invention, nickel-iron-boron films are electrolessly deposited onto a suitably activated substrate by immersing the substrate into an electroless plating bath containing water soluble salts of magnetic metals, such as nickel and ferrous salts, one or several complexing agents, such as sodium potassium tartrate, an alkalizing agent, such as ammonia, to bring the pH above 8, and one or several reducing agents, one of which is a borane, such as dimethylamine borane. The plating temperature is maintained between 0° and 99° C. An orienting filed of at least 5 oersteds or more is applied in the plane of the film during deposition.

The preferred electroless bath composition in terms of maximum preferred and minimum concentrations and other deposition conditions are set forth below.

| | Bath Composition | | |
|---|---|---|---|
| | Max. milli-moles/l. | Preferred milli-moles/l. | Min. milli-moles/l. |
| Dimethylamine borane (DMAB) | 100 | 20 | 5 |
| $Ni^{++}$, as nickelous chloride or other water soluble salts | 200 | 50 | 5 |
| $Fe^{++}$, as ferrous ammonium sulfate or other water soluble salts, ferric salts may also be used instead of ferrous salts | 40 | 4 | 1 |
| NaK-tartrate | 500 | 100 | 10 |
| Ammonia | 300 | 3,600 | 5,000 |
| Plating temp., ° C | 99 | 65 | 20 |
| Film thickness, A | 100,000 | 10,000 | 200 |

The reducing agents which are to be used include boron-nitrogen compounds which carry one to three hydrogen atoms at the boron atom and at least one organic group at the nitrogen atom, such as N-alkyl boranes and N-alkyl borazoles. The following compounds are examples of suitable materials:

(1) Amine boranes, $R_3N—BH_3$, such as, dimethylamine borane, $(CH_3)_2HN \cdot BH_3$;

(2) Amino boranes $RH_2N—BH_2$ such as, monomethylamino borane, $(CH_3)H_2N \cdot BH_2$; and (3) Borazoles, $(RN—BH)_n$, where $n=1$ or 3, such as, N-trimethyl borazole, $(CH_3N—BH)_3$.

Also satisfactory are mixtures of the above with conventional reductants, such as hypophosphites, hydrazine, etc.

Ammonia and derivative, such as, triethanolamine, soluble tertiary amines and other bases such as sodium hydroxide and mixtures thereof are suitable as the alkalizing agents. Glycine may also be used for this purpose.

EXAMPLE

A plating solution was prepared by dissolving 20.2 millimoles of dimethylamine borane, 56.2 millimoles of nickelous chloride, 4 millimoles of ferrous ammonium sulfate, 115 millimoles of sodium-potassium tartrate and 3.6 moles of ammonia in one liter of water. The plating solution was placed in a glass beaker and covered with a layer of xylene. Silicone oil may be used in place of xylene. The plating solution was heated to 65° C. and left at that temperature in a constant temperature bath.

A circular sheet of hardened beryllium-copper of about .003" thickness and 1" diameter was cleaned by the usual dips in 10% hydrochloric acid or similar acid solutions, and dipped into a 0.1% palladium chloride solution for 5 seconds, rinsed and put into the above plating solution at 65° C. for 50 minutes. An orienting field of 40 oersteds was applied in the plane of the deposit during deposition. The field was applied by surrounding the electroless cell with electric coils which generate the desired field.

A deposit of 12,550 A. thickness was formed which contained 19.3% iron, about .8% boron, and the balance nickel. The film had a coercive force $H_0$ of 1 oe., an anisotropic field of 4.8 oe., and a dispersion of the easy axis of 2.5°. The field did not change on bending or stressing of the film, indicating an magnetostrictive constant $\lambda \sim 0$.

The properties of the film can be varied within wide ranges by varying one or several plating parameters, such as, plating time, plating temperature, concentration of reducing agent, concentration of alkalizing agent, concentration of complexing agent, ratio of nickelous to ferrous or ferric ions. Other conditions, such as, outside pressure, concentration of both nickel and iron ions, solvents other than water, etc. may also be varied to modify the properties of the films.

What is claimed is:

1. A method for depositing thin Ni-Fe-B magnetic films on a surface comprising, activating said surface to receive an electrodes deposition, contacting said surface with an aqueous electroless bath consisting essentially of:

water soluble nickel and iron salts, said nickel being present in an amount of from about 5 millimoles/liter to about 200 millimoles/liter, and said iron being present in an amount of from about 1 millimole/liter to about 40 millimoles/liter, a complexing agent, an alkalizing agent in sufficient quantity to maintain the pH of the bath above about 8, and a boron-nitrogen reducing agent carrying from 1 to 3 hydrogen atoms at the boron atom and at least one organic radical at the nitrogen atom, said reducing agent being the source of boron in said Ni-Fe-B magnetic film, said reducing agent being present in an amount of from about 5 to about 100 millimoles/liter, electrolessly depositing a Ni-Fe-B film from said bath onto said surface, while maintaining said bath at a temperature within the range of from about 0° to about 99° C., and applying a magnetic orienting field of at least 5 oersteds in the plane of said film during deposition.

2. The method of claim 1 wherein said boron-nitrogen reducing agent is a compound selected from the group consisting of amine boranes of the formula $R_3N—BH_3$, amino boranes of the formula $RH_2N \cdot BH_2$ and borazoles of the formula $(RN—BH)_n$, where $n$ is 1 or 3.

3. The method of claim 1 wherein said bath has the following composition:

water soluble nickel salt—from 5 to 200 mm./l.
water soluble iron salt—from 1 to 4 mm./l.
complexing agent—from 10 to 500 mm./l.
alkalizing agent—from 300 to 5,000 mm./l., and
boron-nitrogen reducing agent—from 5 to 100 mm./l.

4. The method of claim 2 wherein said boron-nitrogen reducing agent is a compound selected from the group consisting of amine boranes of the formula $R_3N—BH_3$, amino boranes of the formula $RH_2N \cdot BH_2$ and borazoles of the formula $(RN—BH)_n$, where $n$ is 1 or 3.

5. The method of claim 4 wherein said boron-nitrogen reducing agent is dimethylamine borane.

6. The method of claim 1 wherein said bath has the following composition:

soluble $Ni^{++}$ salt—from 5 to 200 mm./l.
soluble $Fe^{++}$ salt—from 1 to 40 mm./l.,
tartrate complexing agent—from 10 to 500 mm./l.,
ammonia—from 300 to 5000 mm./l., and
boron-nitrogen reducing agent—from 5 to 100 mm./l.

7. The method of claim 1 wherein said bath has the following composition:

soluble $Ni^{++}$ salt—from 5 to 50 mm./l.,
soluble $Fe^{++}$ salt—from 1 to 4 mm./l.,
tartrate complexing agent—from 10 to 100 mm./l.,
ammonia—from 300 to 3600 mm./l., and
boron-nitrogen reducing agent—from 5 to 20 mm./l.

8. The method of claim 1 wherein said bath has the following composition:

nickelous chloride—from 5 to 200 mm./l.,
ferrous ammonium sulfate—from 1 to 40 mm./l.,
NaK-tartrate—from 10 to 500 mm./l.,
ammonia—from 300 to 5000 mm./l., and
dimethylamine borane—from 5 to 100 mm./l.

9. The method of claim 1 wherein said bath has the following composition:

nickelous chloride—from 5 to 50 mm./l.,
ferrous ammonium sulfate—from 1 to 4 mm./l.,
NaK-tartrate—from 10 to 100 mm./l.,
ammonia—from 300 to 3600 mm./l., and
dimethylamine borane—from 5 to 20 mm./l.

References Cited

UNITED STATES PATENTS

| | | | |
|---|---|---|---|
| 3,140,188 | 7/1964 | Zirngiebl et al. | 117—160 X |
| 3,295,999 | 12/1967 | Klein et al. | 117—47 X |
| 3,310,430 | 3/1967 | Schneble et al. | 117—130 |
| 3,370,979 | 2/1968 | Schmeckenbecher | 117—236 |
| 3,385,725 | 5/1968 | Schmeckenbecher | 117—130 |

WILLIAM D. MARTIN, Primary Examiner

B. PIANALTO, Assistant Examiner

U.S. Cl. X.R.

117—238, 240

PO-1050
(5/69)

UNITED STATES PATENT OFFICE
CERTIFICATE OF CORRECTION

Patent No. 3,483,029 Dated December 9, 1969

Inventor(s) Herman Koretzky and Arnold F. Schmeckenbecher

It is certified that error appears in the above-identified patent and that said Letters Patent are hereby corrected as shown below:

Column 3, line 7, the word "electrodes" should read -- electroless --. Column 3, line 40, the number "4" should read -- 40 --.

SIGNED AND
SEALED
JUN 23 1970

(SEAL)
Attest:

Edward M. Fletcher, Jr.
Attesting Officer

WILLIAM E. SCHUYLER, JR.
Commissioner of Patents 623-2721-0